(12) United States Patent
Sekiyama (10) Patent No.: US 9,461,513 B2
(45) Date of Patent: Oct. 4, 2016

(54) STATOR FOR ROTATING ELECTRIC MACHINE

(71) Applicant: DENSO CORPORATION, Kariya, Aichi-pref (JP)

(72) Inventor: Yousuke Sekiyama, Toyoake (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/476,084

(22) Filed: Sep. 3, 2014

(65) Prior Publication Data

US 2015/0061470 A1    Mar. 5, 2015

(30) Foreign Application Priority Data

Sep. 4, 2013  (JP) ................................ 2013-182717

(51) Int. Cl.
| | |
|---|---|
| *H02K 3/28* | (2006.01) |
| *H02K 3/48* | (2006.01) |
| *H02K 9/00* | (2006.01) |
| *H02K 3/12* | (2006.01) |
| *H02K 3/38* | (2006.01) |
| *H02K 3/44* | (2006.01) |
| *H02K 9/06* | (2006.01) |

(52) U.S. Cl.
CPC ............ *H02K 3/28* (2013.01); *H02K 3/12* (2013.01); *H02K 3/38* (2013.01); *H02K 3/44* (2013.01); *H02K 3/48* (2013.01); *H02K 9/00* (2013.01); *H02K 9/06* (2013.01)

(58) Field of Classification Search
CPC ................................. H02K 9/00; H02K 3/28
USPC ..................................... 310/60 R, 62, 63, 71
See application file for complete search history.

(56) References Cited

U.S. PATENT DOCUMENTS

| | | | |
|---|---|---|---|
| 6,661,146 B2* | 12/2003 | Oohashi et al. | 310/180 |
| 2006/0220488 A1 | 10/2006 | Koike et al. | |
| 2011/0241476 A1* | 10/2011 | Burch | H02K 3/28 310/257 |
| 2012/0161569 A1* | 6/2012 | Hisada | 310/201 |

FOREIGN PATENT DOCUMENTS

JP    A-2006-280121    10/2006

* cited by examiner

*Primary Examiner* — Terrance Kenerly
(74) *Attorney, Agent, or Firm* — Oliff PLC

(57) ABSTRACT

A stator includes an annular stator core, a stator coil and at least one protective wall. The stator core has a plurality of slots formed therein. The slots are spaced from one another in a circumferential direction of the stator core. The stator coil is comprised of a plurality of windings mounted on the stator core. The windings are connected in a predetermined manner to form a plurality of connection portions therebetween. The connection portions are located outside the slots of the stator core on one axial side of the stator core. The at least one protective wall is provided radially inside the connection portions of the stator coil so as to shield the connection portions from the radially inside of the stator.

9 Claims, 8 Drawing Sheets

FIG.1

FRONT SIDE ←→ REAR SIDE

STATOR FOR ROTATING ELECTRIC MACHINE

CROSS-REFERENCE TO RELATED APPLICATION

This application is based on and claims priority from Japanese Patent Application No. 2013-182717 filed on Sep. 4, 2013, the content of which is hereby incorporated by reference in its entirety into this application.

BACKGROUND

1 Technical Field

The present invention relates to stators for rotating electric machines that are used in, for example, motor vehicles as electric motors and electric generators.

2 Description of Related Art

Japanese Patent Application Publication No. JP2006-280121A discloses a stator for a rotating electric machine. The stator includes a stator coil that is comprised of a pair of first and second three-phase coils. Each of the first and second three-phase coils includes a plurality of phase windings that are connected in a predetermined manner to form a plurality of connection portions therebetween. The stator coil is mounted on an annular stator core of the stator so that: the first and second three-phase coils are different in phase from each other by 30° in electrical angle; and the connection portions of the first three-phase coil are circumferentially offset from the connection portions of the second three-phase coil. Consequently, the connection portions of the first three-phase coil do not overlap the connection portions of the second three-phase coil.

Moreover, in the stator disclosed in the above patent document, each of the first and second three-phase coils includes three output lead portions. Further, each of the first and second three-phase coils is arranged on the stator core so that two of the three output lead portions of the three-phase coil are located on one circumferential side of the connection portions of the three-phase coil and the remaining one of the three output lead portions is located on the other circumferential side of the connection portions. With such an arrangement, it is possible to reduce the lengths of bridging wires which bridge (or extend to electrically connect) the phase windings of the three-phase coil and different sections of the phase windings.

However, in the stator disclosed in the above patent document, the bridging wires are arranged so as not to interfere with the connection portions. Consequently, the radial distances of the bridging wires from the center of rotation of the rotating electric machine become non-uniform; thus a radially inner peripheral surface of the stator coil which is defined by the connection portions and the bridging wires becomes not smooth. As a result, when the connection portions and the bridging wires are subjected to the flow of cooling air created by a cooling fan of the rotating electric machine which is disposed radially inside the stator, pressure variation may occur on the radially inside of the connection portions and the bridging wires in the circumferential direction of the stator core, thereby increasing the fan noise generated during rotation of the cooling fan.

Moreover, in forming the connection portions, end portions of the phase windings are stripped of insulating coats covering them and electrically connected to one another. Then, an electrically-insulative resin is applied to cover the connection portions so as to electrically isolate them. However, with the structure of the stator disclosed in the above patent document, the connection portions are directly viewable from the radially inside of the stator. In other words, the connection portions are directly exposed to the flow of cooling air created by the cooling fan. Consequently, foreign matter, such as dust and electrolytic solution (e.g., saltwater) may flow to the connection portions along with the flow of cooling air created by the cooling fan, thereby damaging the connection portions. As a result, the environmental resistance of the rotating electric machine may be lowered.

SUMMARY

According to an exemplary embodiment, there is provided a stator for a rotating electric machine. The stator includes an annular stator core, a stator coil and at least one protective wall. The stator core has a plurality of slots formed therein. The slots are spaced from one another in a circumferential direction of the stator core. The stator coil is comprised of a plurality of windings mounted on the stator core. The windings are connected in a predetermined manner to form a plurality of connection portions therebetween. The connection portions are located outside the slots of the stator core on one axial side of the stator core. The at least one protective wall is provided radially inside the connection portions of the stator coil so as to shield the connection portions from the radially inside of the stator.

Consequently, with the at least one protective wall, when the stator is subjected to the flow of cooling air created by a cooling fan of the rotating electric machine which is disposed radially inside the stator, it is possible to suppress pressure variation on the radially inside of the connection portions in the circumferential direction of the stator core, thereby reducing the fan noise generated during rotation of the cooling fan. Moreover, it is also possible to protect the connection portions from foreign matter which flows to the stator from the radially inside along with the flow of cooling air created by the cooling fan. As a result, it is possible to improve the environmental resistance of the rotating electric machine.

It is preferable that the at least one protective wall is formed of part of the stator coil.

For example, the at least one protective wall may be formed of at least one bridging wire which bridges two different sections of a corresponding one of the windings of the stator coil.

Preferably, the at least one bridging wire may include a bridging wire that continuously extends in the circumferential direction of the stator core over an angular range within which two or more of the connection portions of the stator coil are arranged.

Preferably, the at least one bridging wire may have a polygonal cross-sectional shape and is bent to have a curved side face facing radially inward.

Preferably, the at least one bridging wire may include a plurality of bridging wires that are arranged in alignment with each other in an axial direction of the stator core.

The at least one protective wall may include a plurality of protective walls that are separated from one another in the circumferential direction of the stator core; each of the plurality of protective walls is formed of at least one bridging wire.

It is preferable that the at least one protective wall has a greater axial height than the connection portions of the stator coil.

The stator may be mounted in the rotating electric machine so as to have a cooling fan of the rotating electric machine located radially inside the stator. In this case, it is preferable that the at least one protective wall is axially positioned so as to be radially aligned with the cooling fan.

BRIEF DESCRIPTION OF THE DRAWINGS

The present invention will be understood more fully from the detailed description given hereinafter and from the accompanying drawings of one exemplary embodiment, which, however, should not be taken to limit the invention to the specific embodiment but are for the purpose of explanation and understanding only.

In the accompanying drawings.

DESCRIPTION OF EMBODIMENT

Figure 1:
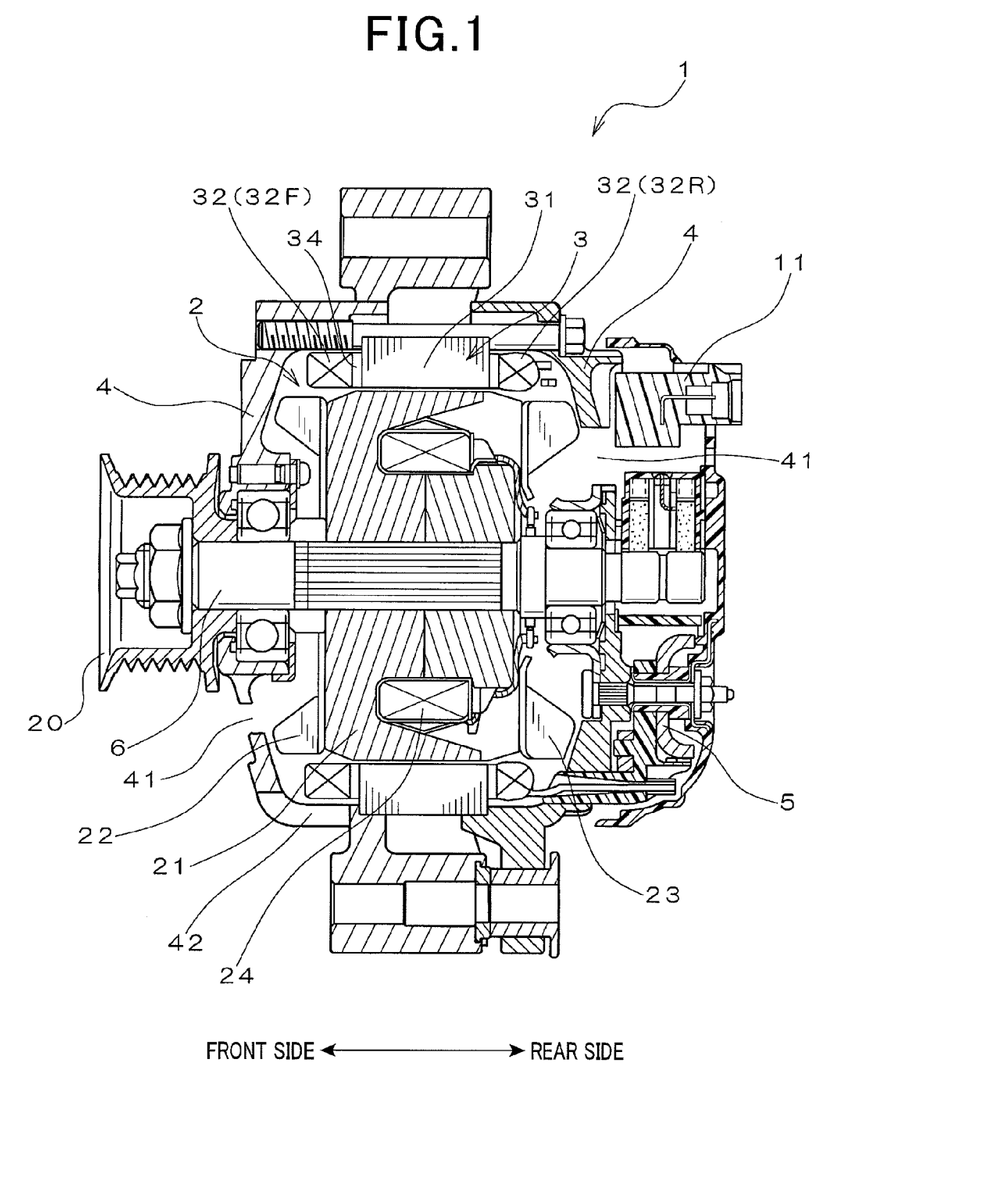
FIG. 1 is a schematic cross-sectional view of an automotive alternator which includes a stator according to the exemplary embodiment.

FIG. 1 shows the overall configuration of an automotive alternator 1 which includes a stator 3 according to an exemplary embodiment. The alternator 1 is designed to be used in a motor vehicle, such as a passenger car or a truck.

As shown in FIG. 1, the alternator 1 includes, in addition to the stator 3, a rotor 2, a frame 4, a rectifier 5, a voltage regulator 11 and a pulley 20.

The rotor 2 includes a rotating shaft 6, a pair of Lundell-type magnetic pole cores 21 and a field coil 24. The rotating shaft 6 is rotatably supported by the frame 4 via bearings. The rotating shaft 6 has the pulley 20 mounted on a front end portion (i.e., a left end portion in FIG. 1) thereof, so that it can be driven by an internal combustion engine (not shown in the figures) of the vehicle via the pulley 20. Each of the magnetic pole cores 21 has a plurality of magnetic pole claws. The field coil 24 is made of, for example, an insulation-treated copper wire and wound into an annular shape. The magnetic pole cores 21 are fixed on the rotating shaft 6 with the field coil 24 held between the magnetic pole cores 21. In addition, on a rear end portion (i.e., a right end portion in FIG. 1) of the rotating shaft 6, there are provided a pair of slip rings via which field current is supplied to the field coil 24 during rotation of the rotor 2.

The stator 3 includes an annular (or hollow cylindrical) stator core 31 and a stator coil 32 mounted on the stator core 31. The detailed configuration of the stator 3 will be described later.

The frame 4 has both the rotor 2 and the stator 3 retained therein so that the stator 3 surrounds a radially outer periphery of the rotor 2 with a predetermined radial gap formed therebetween.

The rectifier 5 rectifies three-phase AC power outputted from the stator coil 32 into DC power and outputs the obtained DC power via output terminals thereof.

The voltage regulator 11 regulates the voltage of the DC power outputted from the rectifier 5.

Moreover, in the present embodiment, the alternator 1 further includes a pair of cooling fans 22 and 23 that are respectively provided on axial end faces of the magnetic pole cores 21 of the rotor 2. The cooling fans 21 and 22 suck cooling air into the alternator 1 via suction openings 41 formed in front and rear end walls of the frame 4 and discharge the cooling air out of the alternator 1 via discharge openings 42 formed in a circumferential wall (or side wall) of the frame 4. With the cooling air, it is possible to cool the stator coil 32, the rectifier 5 and the regulator 11 during operation of the alternator 1. In addition, it should be noted that though not shown in FIG. 1, the discharge openings 42 are formed not only in a front part but also in a rear part of the frame 4.

After having described the overall configuration of the alternator 1, the detailed configuration of the stator 3 according to the present embodiment will be described with reference to FIGS. 2-9.

In the present embodiment, the annular stator core 31 is formed by laminating a plurality of steel sheets in the axial direction. In the radially inner surface of the stator core 31, there are formed a plurality of slots 310 so as to penetrate the stator core 31 in the axial direction. Moreover, the slots 310 are spaced from one another in the circumferential direction of the stator core 31 at a constant pitch and each extend in a radial direction of the stator core 31. That is, for each of the slots 310, the depth direction of the slot 310 coincides with the radial direction of the stator core 31.

The stator coil 32 is mounted on the stator core 31 so as to be partially received in the slots 310 of the stator core 31 with insulating sheets 34 interposed between the stator coil 32 and those internal walls of the stator core 31 which define the slots 310. Moreover, as shown in FIG. 1, the stator coil 32 has a front-side coil end part 32F protruding from a front end face (or a first axial end face) of the stator core 31 and a rear-side coil end part 32R protruding from a rear end face (or a second axial end face) of the stator core 31.

Figure 2:
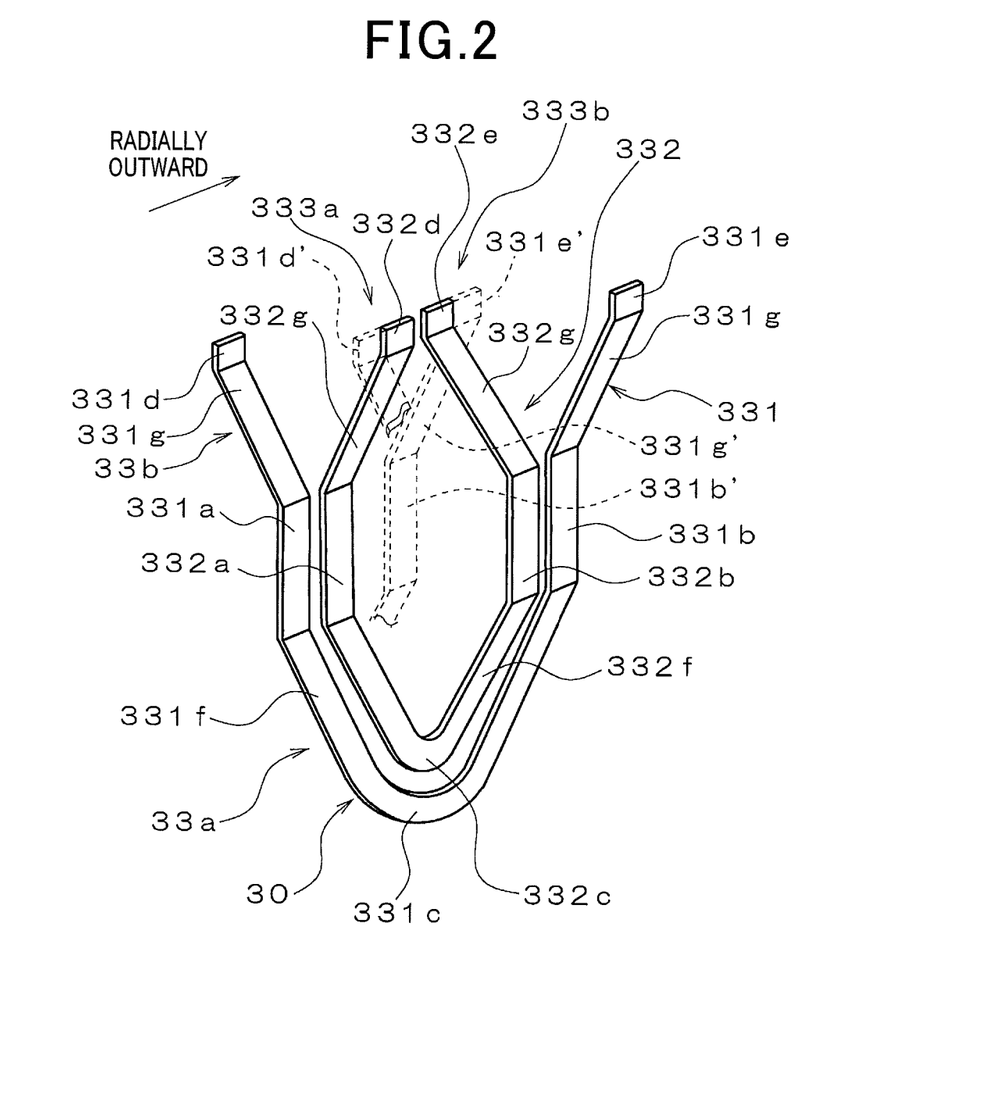
FIG. 2 is a schematic perspective view illustrating the configuration of electric conductor segments forming a stator coil of the stator.
Figure 3:
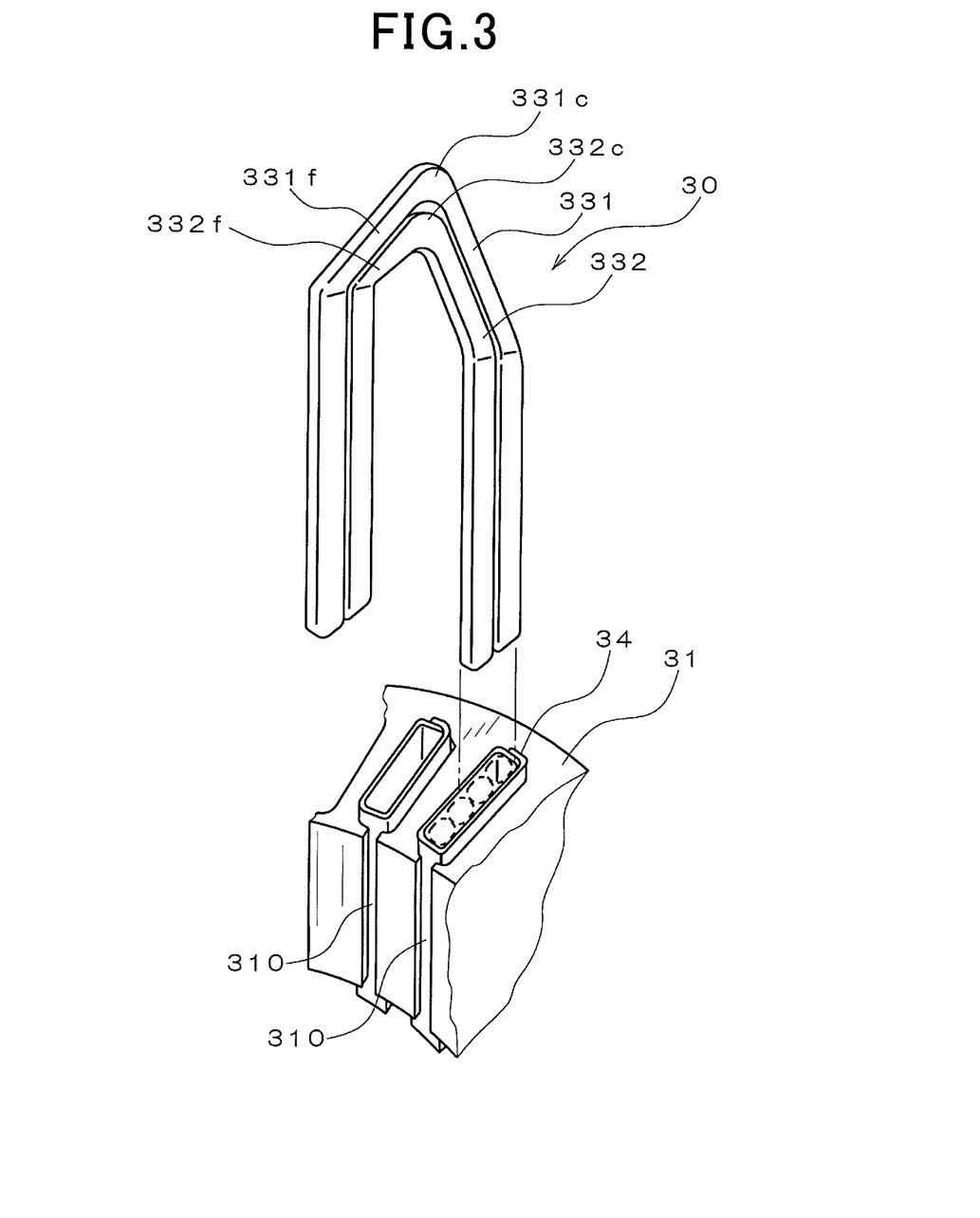
FIG. 3 is a schematic perspective view illustrating a process of inserting the electric conductor segments into slots formed in a stator core of the stator.

The stator coil 32 can be considered as being formed by connecting electric conductors received in the slots 310 of the stator core 31. That is, as illustrated in FIGS. 2-3, in each of the slots 310 of the stator core 31, there are received an even number (e.g., four in the present embodiment) of electric conductors in alignment with each other in the radial direction of the stator core 31 (or in the depth direction of the slot 310). Hereinafter, for the sake of convenience of explanation, the four electric conductors are sequentially referred to as an innermost conductor, an inner-middle conductor, an outer-middle conductor and an outermost conductor from the radially inside to the radially outside of the slot 310. In addition, in the present embodiment, each of the electric conductors has a substantially rectangular cross section.

Moreover, the electric conductors received in the slots 310 of the stator core 31 are electrically connected to one another in a predetermined pattern.

Specifically, referring to FIG. 2, for one of the slots 310, the innermost conductor 331a in the slot 310 is electrically connected, via a connecting conductor 331c, to the outermost conductor 331b in another one of the slots 310 which is positioned away from the slot 310 by one magnetic pole pitch in the clockwise direction; the connecting conductor 331c is located on a first axial side of the stator core 31 (i.e., the lower side in FIG. 2 and the rear side in FIG. 1). In addition, it should be noted that "the clockwise direction" hereinafter denotes the clockwise direction with the point of sight located on the first axial side of the stator core 31.

Similarly, for one of the slots 310, the inner-middle conductor 332a in the slot 310 is connected, via a connecting conductor 332c, to the outer-middle conductor 332b in another one of the slots 310 which is positioned away from the slot 310 by one magnetic pole pitch in the clockwise direction; the connecting conductor 332c is also located on the first axial side of the stator core 31.

Consequently, on the first axial side of the stator core 31, each of the connecting conductors 332c that respectively connect pairs of the inner-middle conductors 332a and the outer-middle conductors 332b is partially surrounded by a corresponding one of the connecting conductors 331c that respectively connect pairs of the innermost conductors 331a and the outermost conductors 331b. As a result, all the connecting conductors 332c together form an axially inner layer of the rear-side coil end part 32R of the stator coil 32; all the connecting conductors 331c together form an axially outer layer of the rear-side coil end part 32R of the stator coil 32.

Moreover, for one of the slots 310, the inner-middle conductor 332a in the slot 310 is electrically connected, on a second axial side of the stator core 31 (i.e., the upper side in FIG. 2 and the front side in FIG. 1), to the innermost conductor 331a' in another one of the slots 310 which is positioned away from the slot 310 by one magnetic pole pitch in the clockwise direction. More specifically, the inner-middle conductor 332a is electrically connected to the innermost conductor 331a' by joining, for example by TIG welding or ultrasonic welding, a pair of connecting conductors 332g and 331g' that respectively extend from the inner-middle conductor 332a and the innermost conductor 331a'. In addition, it should be noted that the superscript ['] (i.e., apostrophe) is attached to some of the electric conductors hereinafter only for the sake of convenience of explanation and ease of understanding.

Similarly, for one of the slots 310, the outermost conductor 331b' in the slot 310 is electrically connected, on the second axial side of the stator core 31, to the outer-middle conductor 332b in another one of the slots 310 which is positioned away from the slot 310 by one magnetic pole pitch in the clockwise direction. More specifically, the outermost conductor 331b' is electrically connected to the outer-middle conductor 332b by joining, for example by TIG welding or ultrasonic welding, a pair of connecting conductors 331g' and 332g that respectively extend from the outermost conductor 331b' and the outer-middle conductor 332b.

Figure 4:
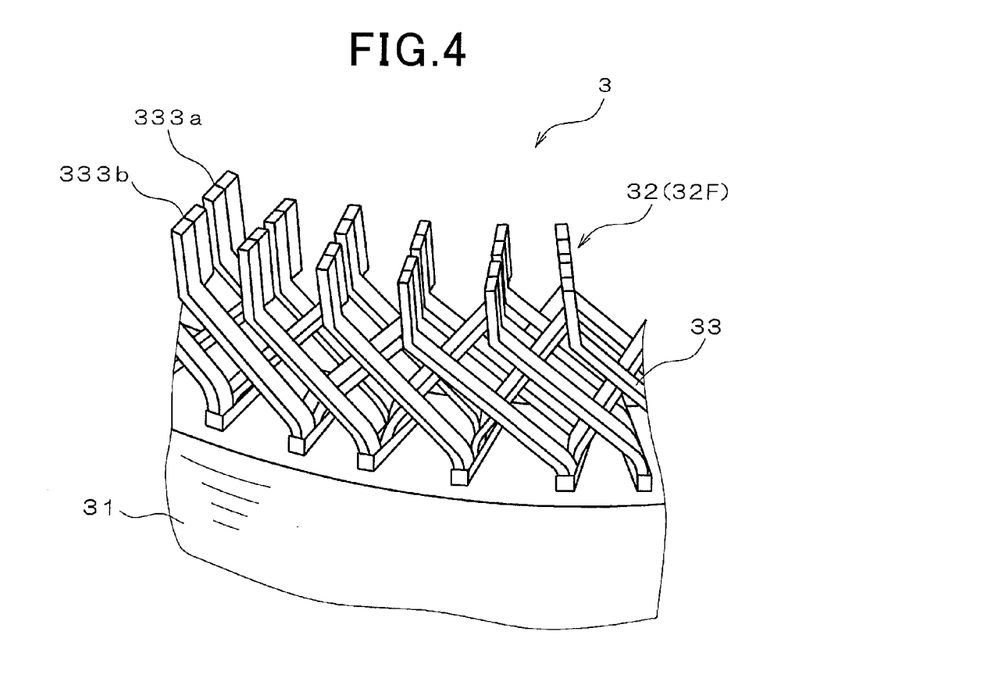
FIG. 4 is a schematic perspective view illustrating pairs of end portions of the electric conductor segments joined at a front-side coil end part of the stator coil.

Consequently, on the second axial side of the stator core 31, each of joints 333a formed between end portions 332d of the connecting conductors 332g and end portions 331d' of the connecting conductors 331g' is offset from a corresponding one of joints 333b formed between end portions 331e' of the connecting conductor 331g' and end portions 332e of the connecting conductors 332g both in the radial and circumferential directions of the stator core 31. As a result, as shown in FIG. 4, all the joints 333a fall on the same circle to form a radially inner layer of the front-side coil end part 32F of the stator coil 32; all the joints 333b fall on the same circle to form a radially outer layer of the front-side coil end part 32F.

Moreover, in the present embodiment, the stator coil 32 is formed of a plurality of substantially U-shaped electric conductor segments 30. Further, the electric conductor segments 30 are comprised of a plurality of pairs of large and small electric conductor segments 331 and 332. More specifically, as shown in FIG. 2, each connected set of the innermost conductor 331a, outermost conductor 331b, connecting conductor 331c on the first axial side of the stator core 31 and connecting conductors 331g on the second axial side of the stator core 31 is formed in one piece construction by using one of the large electric conductor segments 331. On the other hand, each connected set of the inner-middle conductor 332a, outer-middle conductor 332b, connecting conductor 332c on the first axial side of the stator core 31 and connecting conductors 332g on the second axial side of the stator core 31 is formed in one piece construction by using one of the small electric conductor segments 332.

In other words, each of the large electric conductor segments 331 has a pair of in-slot portions 331a and 331b respectively received in two slots 310 of the stator core 31 which are circumferentially apart from each other by one magnetic pole pitch, a turn portion 331c that connects the pair of in-slot portions 331a and 331b on the first axial side of the stator core 31, and a pair of oblique portions 331g that respectively protrude from the pair of in-slot portions 331a and 331b on the second axial side of the stator core 31 and extend obliquely at predetermined angles with respect to the axial direction of the stator core 31. In addition, the turn portion 331c includes a pair of oblique portions 331f that extend obliquely at predetermined angles with respect to the axial direction of the stator core 31. Similarly, each of the small electric conductor segments 332 has a pair of in-slot portions 332a and 332b respectively received in two slots 310 of the stator core 31 which are circumferentially apart from each other by one magnetic pole pitch, a turn portion 332c that connects the pair of in-slot portions 332a and 332b on the first axial side of the stator core 31, and a pair of oblique portions 332g that respectively protrude from the pair of in-slot portions 332a and 332b on the second axial side of the stator core 31 and extend obliquely at predetermined angles with respect to the axial direction of the stator core 31. In addition, the turn portion 332c includes a pair of oblique portions 332f that extend obliquely at predetermined angles with respect to the axial direction of the stator core 31.

Consequently, with the large and small electric conductor segments 331 and 332, the stator coil 32 is formed in a lap winding manner on the stator core 31. Moreover, all of the turn portions 331c of the large electric conductor segments 331 and the turn portions 332c of the small electric conductor segments 332 together constitute the rear-side coil end part 32R of the stator coil 32; all of the oblique portions 331g of the large electric conductor segments 331 and the oblique portions 332g of the small electric conductor segments 332 together constitute the front-side coil end part 32F of the stator coil 32 (see FIG. 1). In addition, during rotation of the rotor 2, the flow of cooling air created by the cooling fans 22 and 23 passes through the front-side and rear-side coil end parts 32F and 32R of the stator coil 32, thereby cooling them.

Figure 5:
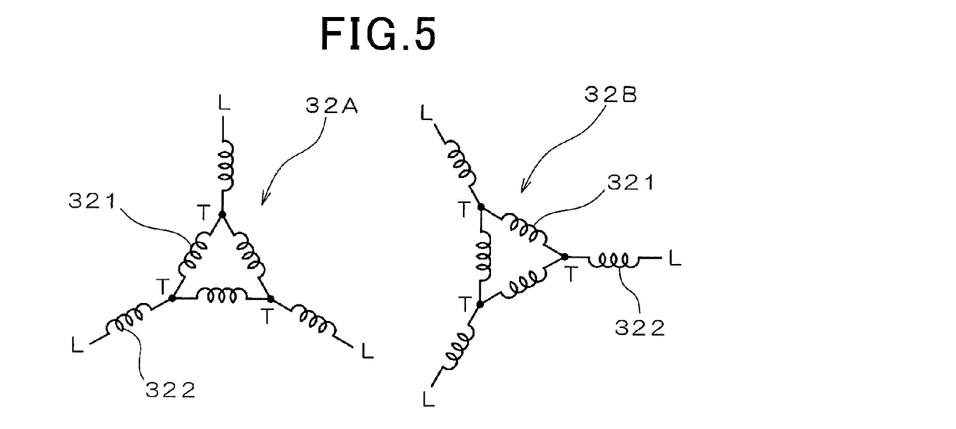
FIG. 5 is a schematic circuit diagram of the stator coil which is comprised of a pair of three-phase coils.

In the present embodiment, the electric conductor segments 30 are electrically connected in the above-described manner to form a pair of first and second three-phase coils 32A and 32B as shown in FIG. 5. Moreover, the first and second three-phase coils 32A and 32B together constitute the stator coil 32. In other words, in the present embodiment, the stator coil 32 is comprised of the pair of three-phase coils 32A and 32B. In addition, the first and second three-phase coils 32A and 32B are mounted on the stator core 31 so as to be different in phase from each other by 30° in electrical angle.

Furthermore, in the present embodiment, as shown in FIG. 5, the first three-phase coil 32A includes three first phase windings 321 and three second phase windings 322. The first phase windings 321 are Δ-connected to form three connection portions (or junctions) T between corresponding end portions of the first phase windings 321. Each of the second phase windings 322 has one end portion connected to a corresponding one of the connection portions T and the other end portion forming an output lead portion L of the first three-phase coil 32A. That is, in the present embodiment, the first and second phase windings 321 and 322 are connected in a Δ-Y combined manner to form the three connection portions T and three output lead portions L of the first three-phase coil 32A. Each of the connection portions T is formed between the corresponding end portions of two first phase windings 321 and one second phase winding 322. Each of the output lead portions L is formed of the other end portion of one second phase winding 322 and connected to the rectifier 5 (not shown in FIG. 5) of the alternator 1.

As to the second three-phase coil 32B, it has the same configuration as the first three-phase coil 32A. Therefore, for the sake of avoiding redundancy, description of the second three-phase coil 32B is omitted hereinafter.

Figure 6:
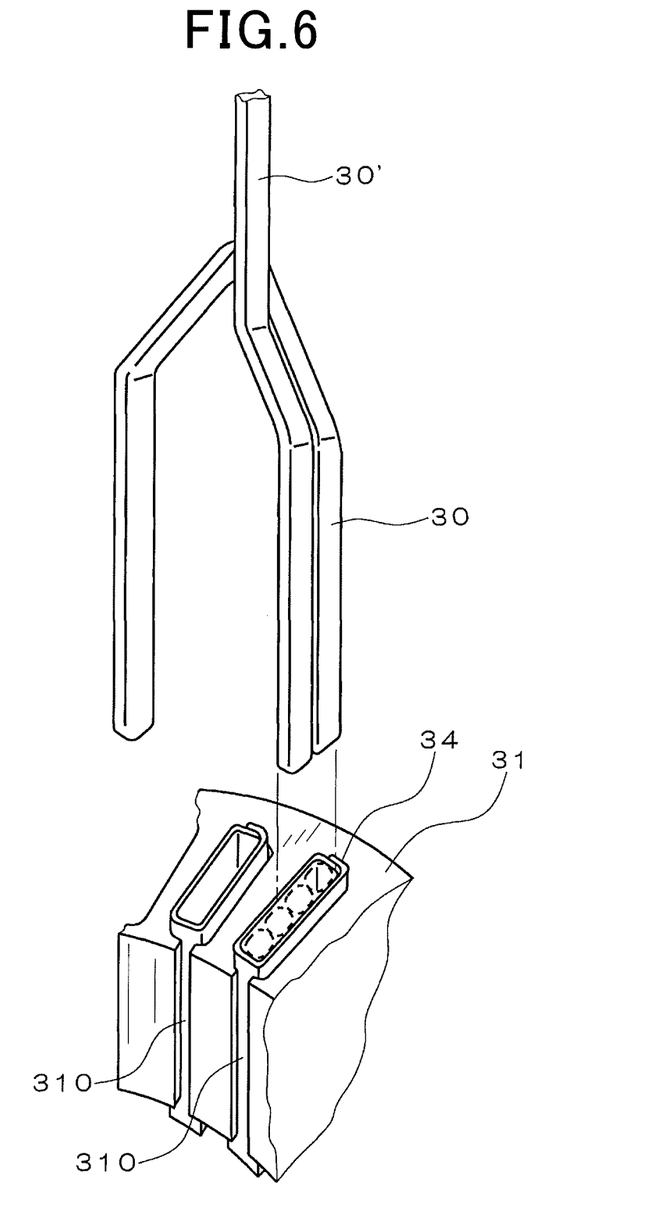
FIG. 6 is a schematic perspective view illustrating the configuration of electric conductor segments forming output lead portions and connection portions of the stator coil.

Moreover, in the present embodiment, the connection portions T and output lead portions L of the first and second three-phase coils 32A and 32B are formed using electric conductor segments 30' as shown in FIG. 6.

Specifically, compared to the above-described substantially U-shaped electric conductor segments 30, each of the electric conductor segments 30' is not bent back at the turn portion, thus having two straight portions extending parallel to each other. Each of the electric conductor segments 30' is inserted in a corresponding one of the slots 310 of the stator core 31 from the first axial side of the stator core 31 (i.e., the upper side in FIG. 6 and the rear side in FIG. 1), so as to have one end portion thereof protruding from the corresponding slot 310 on the second axial side (i.e., the lower side in FIG. 6 and the front side in FIG. 1). The end portion is then bent to extend obliquely at a predetermined angle with respect to the axial direction of the stator core 31. Thereafter, the end portion is joined to a corresponding one of the oblique portions of the electric conductor segments 30 (i.e., the oblique portions 331g of the large electric conductor segments 331 and the oblique portions 332g of the small electric conductor segments 332 in FIG. 2), thereby making up a portion of the front-side coil end part 32F of the stator coil 32 as shown in FIG. 4. On the other hand, the other end portions of the electric conductor segments 30', which remain on the first axial side of the stator core 31, make up the connection portions T and output lead portions L of the first and second three-phase coils 32A and 32B; the connection portions T and the output lead portions L protrude from the rear-side coil end part 32R of the stator coil 32.

Accordingly, with the electric conductor segments 30', it is possible to easily form the connection portions T and output lead portions L of the first and second three-phase coils 32A and 32B. In addition, like the electric conductor segments 30, each of the electric conductor segments 30' also has a substantially rectangular cross section.

Next, the outstanding features of the stator 3 according to the present embodiment will be described.

Figure 7:
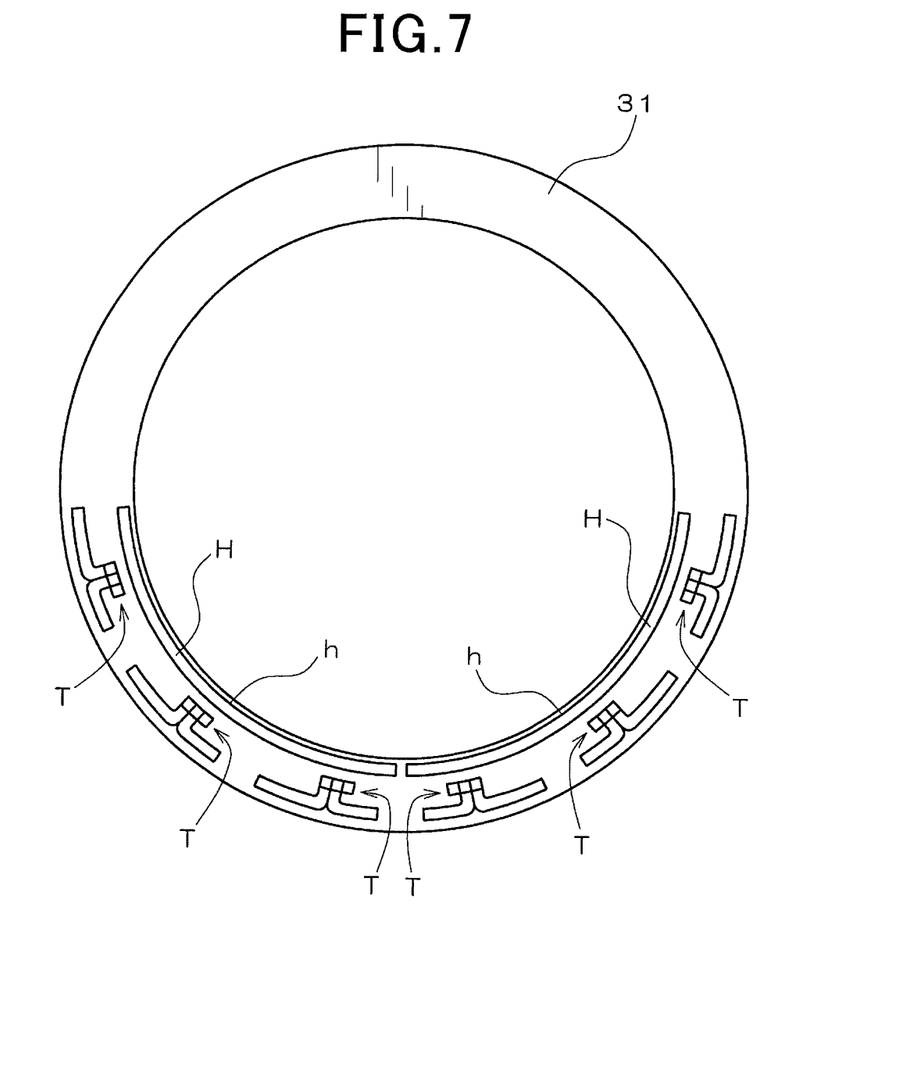
FIG. 7 is a schematic axial end view illustrating the arrangement of the connection portions and bridging wires of the stator coil, the bridging wires being located radially inside the connection portions.

In the present embodiment, as shown in FIG. 7, the total of six connection portions T of the stator coil 32 are arranged along the circumferential direction of the stator core 31. Further, there are provided two protective walls h radially inside the connection portions T so as to shield the connection portions T from the radially inside of the stator 3. Consequently, with the protective walls h, when the stator 3 is subjected to the flow of cooling air created by the cooling fan 23 (see FIGS. 1 and 9), it is possible to suppress pressure variation on the radially inside of the connection portions T in the circumferential direction of the stator core 31, thereby reducing the fan noise generated during rotation of the cooling fan 23. Moreover, it is also possible to protect the connection portions T from foreign matter which flows to the stator 3 from the radially inside along with the flow of cooling air created by the cooling fan 23; this foreign matter may include, for example, dust and electrolytic solution such as saltwater. As a result, it is possible to improve the environmental resistance of the alternator 1.

Moreover, in the present embodiment, the protective walls h are formed of bridging wires H included in the stator coil 32.

Specifically, in the present embodiment, though not shown in the figures, each of the first phase windings 321 of the first and second three-phase coils 32A and 32B includes a plurality (e.g., two) of sections that are separated from each other in the circumferential direction of the stator core 31. Each of the sections is formed of a predetermined number of the above-described electric conductor segments 30. Further, each adjacent pair of the sections are connected by one bridging wire H. In other words, the stator coil 32 includes a plurality of bridging wires H each of which bridges (or extends to electrically connect) one adjacent pair of the sections of a corresponding one of the first phase windings 321. Furthermore, at least part of the bridging wires H are arranged on the radially inside of the connection portions T to make up the protective walls h.

More specifically, in the present embodiment, as shown in FIG. 7, there are provided two protective walls h each of which circumferentially extends over an angular range within which corresponding circumferentially-adjacent three of the six connection portions T are arranged. Thus, each of the protective walls h shields the three corresponding circumferentially-adjacent connection portions T from the radially inside of the stator 3.

Moreover, each of the protective walls h is formed of at least one bridging wire H that extends continuously in the circumferential direction of the stator core 31 over the angular range within which the three corresponding circumferentially-adjacent connection portions T are arranged. Consequently, it is possible to form a continuous wall surface on the radially inside of the three corresponding circumferentially-adjacent connection portions T, thereby more effectively suppressing pressure variation on the radially inside of the connection portions T in the circumferential direction of the stator core 31 and thus more effectively reducing the fan noise generated during rotation of the cooling fan 23.

Furthermore, in the present embodiment, each of the bridging wires H has a substantially rectangular cross-sectional shape. Further, each of the bridging wires H forming the protective walls h is bent to have a curved side face thereof facing radially inward. Consequently, with the curved side faces of the bridging wires H facing radially inward, it is possible to more effectively suppress pressure variation on the radially inside of the connection portions T in the circumferential direction of the stator core 31, thereby more effectively reducing the fan noise generated during rotation of the cooling fan 23.

In the present embodiment, each of the protective walls h is formed of a plurality (e.g., two in FIG. 8) of bridging wires H that are arranged in alignment with each other in the axial direction of the stator core 31. Consequently, compared to a case where each of the protective walls h is formed of a single bridging wire H, it is possible to increase the area of the radially inner surface of each of the protective walls h, thereby more reliably shielding the connection portions T from the radially inside of the stator 3. As a result, it is possible to more reliably protect the connection portions T from foreign matter which flows to the stator 3 from the radially inside along with the flow of cooling air created by the cooling fan 23.

In the present embodiment, there provided the two protective walls h that are separated from each other in the circumferential direction of the stator core 31. Each of the protective walls h is formed so as to protect the three corresponding circumferentially-adjacent connection portions T. Consequently, compared to a case where there is provided only one protective wall h for protecting all the six connection portions T of the stator coil 32, it is possible to reduce the lengths of the bridging wires H for forming the protective walls h, thereby improving the productivity.

Figure 8:
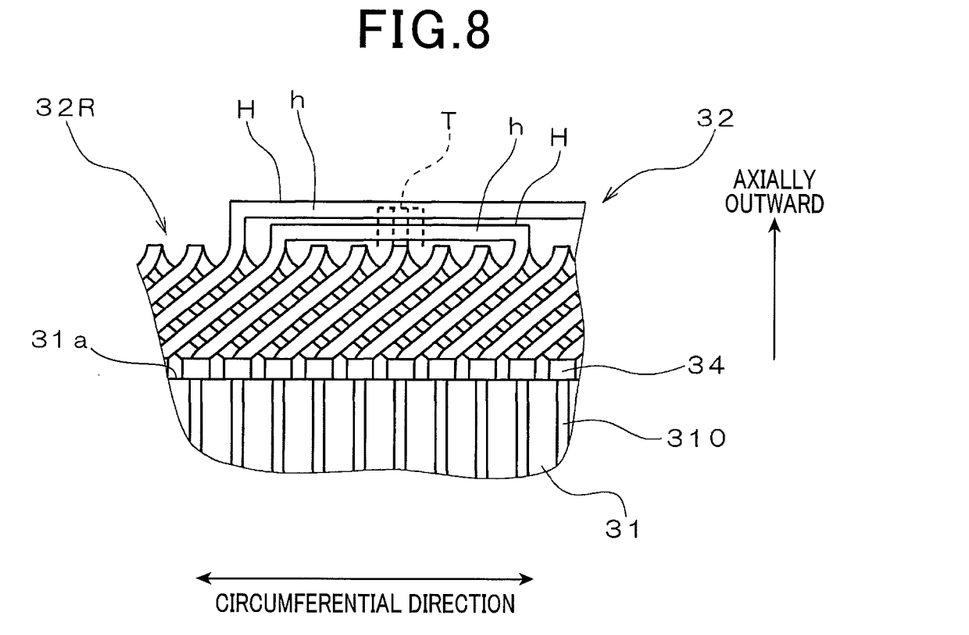
FIG. 8 is a schematic view of part of the stator from the radially inside.

In the present embodiment, as shown in FIG. 8, the protective walls h have a greater axial height from the rear-side coil end part 32R of the stator coil 32 (or from the second axial end face 31a of the stator core 31) than the connection portions T. Consequently, the protective walls h can completely shield the connection portions T so that the connection portions T cannot be directly viewable from the radially inside of the stator 3. As a result, it is possible to more reliably protect the connection portions T from foreign matter which flows to the stator 3 from the radially inside along with the flow of cooling air created by the cooling fan 23.

Figure 9:
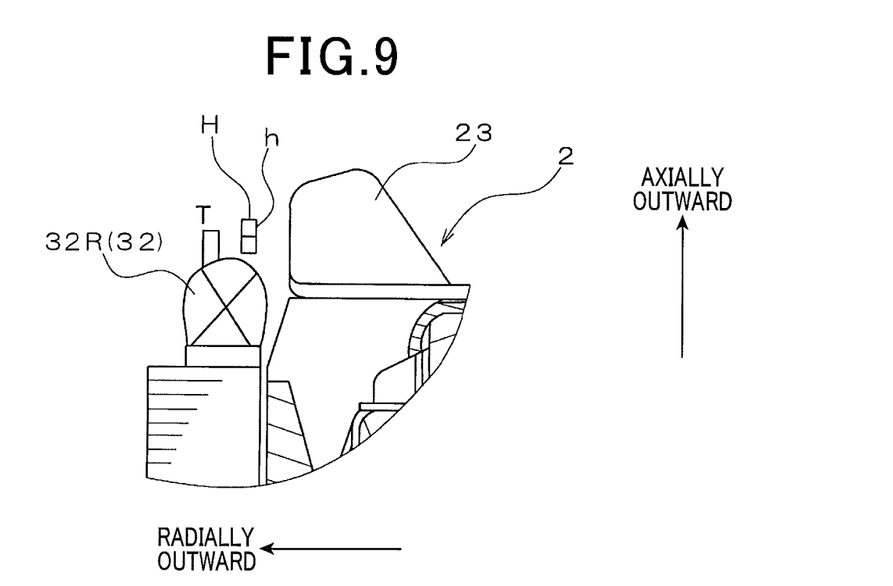
FIG. 9 is a schematic view illustrating the positional relationship between the connection portions, the bridging wires, and a cooling fan of the automotive alternator.

In the present embodiment, as shown in FIG. 9, the protective walls h are axially positioned so as to be radially aligned with the cooling fan 23. Consequently, when the connection portions T are also radially aligned with the cooling fan 23 and thus most susceptible to the flow of cooling air created by the cooling fan 23, it is still possible for the protective walls h to reliably shield the connection portions T from the flow of cooling air created by the cooling fan 23. As a result, it is possible to more effectively lower the fan noise during rotation of the cooling fan 23 and improve the environmental resistance of the alternator 1.

The above-described stator 3 according to the present embodiment has the following advantages.

In the present embodiment, the stator 3 includes the annular stator core 31 and the stator coil 32. The stator core 31 has the slots 310 formed therein. The slots 310 are spaced from one another in the circumferential direction of the stator core 31. The stator coil 32 is comprised of the pair of first and second three-phase coils 32A and 32B; each of the first and second three-phase coils 32A and 32B is comprised of the three first phase windings 321 and the three second phase windings 322. That is, the stator coil 32 is comprised of a total of six first phase windings 321 and six second phase windings 322 mounted on the stator core 31. The first and second phase windings 321 and 322 are connected in a predetermined manner (i.e., in the Δ-Y combined manner as shown in FIG. 5) to form a total of six connection portions T therebetween. The connection portions T are located outside the slots 310 of the stator core 31 on the first axial side of the stator core 31 (i.e., the rear side in FIG. 1 and the upper side in FIGS. 8-9). Moreover, the stator 3 further includes at least one protective wall h, more specifically the two protective walls h in the present embodiment. The two protective walls h are provided radially inside the connection portions T of the stator coil 32 so as to shield the connection portions T from the radially inside of the stator 3 (see FIGS. 7-9).

Consequently, with the protective walls h, when the stator 3 is subjected to the flow of cooling air created by the cooling fan 23, it is possible to suppress pressure variation on the radially inside of the connection portions T in the circumferential direction of the stator core 31, thereby reducing the fan noise generated during rotation of the cooling fan 23. Moreover, it is also possible to protect the connection portions T from foreign matter which flows to the stator 3 from the radially inside along with the flow of cooling air created by the cooling fan 23. As a result, it is possible to improve the environmental resistance of the alternator 1.

Moreover, in the present embodiment, the protective walls h are formed of part of the stator coil 32, more specifically of the bridging wires H of the stator coil 32. Each of the bridging wires H bridges two different sections of a corresponding one of the first phase windings 321.

Consequently, it becomes possible to form the protective walls h without employing any additional members. As a result, it becomes possible to reduce the parts count and thus the manufacturing cost of the stator 3.

In the present embodiment, each of the protective walls h is formed of at least one bridging wire H that extends continuously in the circumferential direction of the stator core 31 over the angular range within which the three corresponding circumferentially-adjacent connection portions T are arranged (see FIG. 7).

Consequently, it is possible to form a continuous wall surface on the radially inside of the three corresponding circumferentially-adjacent connection portions T, thereby more effectively suppressing pressure variation on the radially inside of the connection portions T in the circumferential direction of the stator core 31 and thus more effectively reducing the fan noise generated during rotation of the cooling fan 23.

In the present embodiment, each of the bridging wires H forming the protective walls h has the substantially rectangular cross-sectional shape and is bent to have the curved side face facing radially inward (see FIG. 7).

Consequently, with the curved side faces of the bridging wires H facing radially inward, it is possible to more effectively suppress pressure variation on the radially inside of the connection portions T in the circumferential direction of the stator core 31, thereby more effectively reducing the fan noise generated during rotation of the cooling fan 23.

In the present embodiment, each of the protective walls h is formed of the two bridging wires H that are arranged in alignment with each other in the axial direction of the stator core 31 (see FIG. 8).

Consequently, compared to a case where each of the protective walls h is formed of a single bridging wire H, it is possible to increase the area of the radially inner surface of each of the protective walls h, thereby more reliably shielding the connection portions T from the radially inside of the stator 3. As a result, it is possible to more reliably protect the connection portions T from foreign matter which flows to the stator 3 from the radially inside along with the flow of cooling air created by the cooling fan 23.

In the present embodiment, the stator 3 includes the two protective walls h that are separated from each other in the circumferential direction of the stator core 31. Each of the protective walls h is formed so as to protect the three corresponding circumferentially-adjacent connection portions T (see FIG. 7).

Consequently, compared to a case where the stator 3 includes only one protective wall h for protecting all the six connection portions T of the stator coil 32, it is possible to reduce the lengths of the bridging wires H for forming the protective walls h, thereby improving the productivity.

In the present embodiment, the protective walls h have a greater axial height than the connection portions T (see FIG. 8).

Consequently, the protective walls h can completely shield the connection portions T so that the connection portions T cannot be directly viewable from the radially inside of the stator 3. As a result, it is possible to more reliably protect the connection portions T from foreign matter which flows to the stator 3 from the radially inside along with the flow of cooling air created by the cooling fan 23.

In the present embodiment, the stator 3 is mounted in the alternator 1 so as to have the cooling fan 23 located radially inside the stator 3. Further, the protective walls h are axially positioned so as to be radially aligned with the cooling fan 23 (see FIG. 9).

Consequently, when the connection portions T are also radially aligned with the cooling fan 23 and thus most susceptible to the flow of cooling air created by the cooling fan 23, it is still possible for the protective walls h to reliably shield the connection portions T from the flow of cooling air created by the cooling fan 23. As a result, it is possible to more effectively lower the fan noise during rotation of the cooling fan 23 and improve the environmental resistance of the alternator 1.

While the above particular embodiment has been shown and described, it will be understood by those skilled in the art that various modifications, changes, and improvements may be made without departing from the spirit of the invention.

For example, in the previous embodiment, the protective walls h are formed of part of the stator coil 32, more specifically of the bridging wires H included in the stator coil 32.

However, it is also possible to form dedicated protective walls h separately from and then joined to the stator coil 32. Moreover, it is possible to form the protective walls h utilizing other part of the stator coil 32 than the bridging wires H, such as the output lead portions L (see FIGS. 5-6).

In the previous embodiment, each of the bridging wires H has the substantially rectangular cross-sectional shape. However, each of the bridging wires H may also have other polygonal cross-sectional shapes (e.g., a triangular or pentagonal cross-sectional shape). In any case, it is preferable that each of the bridging wires H is bent and arranged with a curved side face thereof facing radially inward.

In the previous embodiment, each of the protective walls h is formed of the two bridging wires H that are arranged in alignment with each other in the axial direction of the stator core 31. However, each of the protective walls h may also be formed of three or more bridging wires H that are arranged in alignment with each other in the axial direction of the stator core 31. Alternatively, each of the protective walls h may also be formed of a single bridging wire H.

In the previous embodiment, the stator 3 has the two protective walls h arranged in the circumferential direction of the stator core 31. However, the stator 3 may also have three or more protective walls h arranged in the circumferential direction of the stator core 31. Alternatively, the stator 3 may have only one protective wall h that is formed so as to shield all the six connection portions T of the stator coil 32 from the radially inside of the stator 3.

In the previous embodiment, the protective walls h are configured to have a greater axial height than the connection portions T. However, the protective walls h may also be configured to have a smaller axial height than the connection portions T.

In the previous embodiment, the stator coil 32 is formed of the electric conductor segments 30 and 30' which have the substantially rectangular cross-sectional shape. However, the stator coil 32 may also be formed of electric conductor segments which have other cross-sectional shapes (e.g., a substantially circular cross-sectional shape).

Furthermore, each of the first and second phase windings 321 and 322 of the first and second three-phase coils 32A and 32B of the stator coil 32 may be formed of instead of the electric conductor segments, a single continuous electric conductor wire which has a suitable cross-sectional shape (e.g., a substantially rectangular or circular cross-sectional shape).

Figure 10:
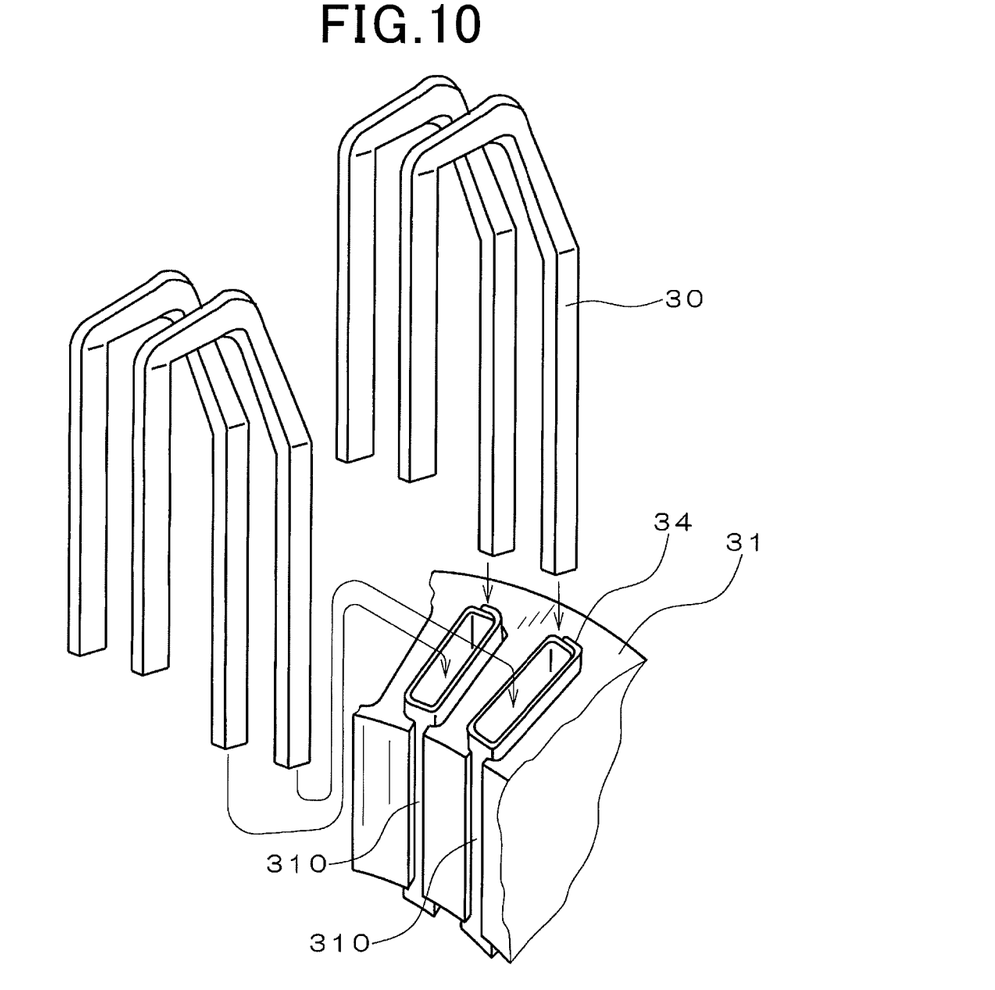
FIG. 10 is a schematic perspective view illustrating the configuration of electric conductor segments forming the stator coil according to a modification.

In the previous embodiment, the stator coil 32 is formed of the plurality of pairs of the large and small electric conductor segments 331 and 332 (see FIG. 2). However, as shown in FIG. 10, the stator coil 32 may be formed of a plurality of identical electric conductor segments 30 which are substantially U-shaped. Moreover, with the identical electric conductor segments 30, the stator coil 32 may be formed in a wave winding manner on the stator core 31.

In the previous embodiment, the stator coil 32 is comprised of the first and second three-phase coils 32A and 32B each of which is connected in the Δ-Y combined manner (see FIG. 5). However, the stator coil 32 may be comprised of only one of the first and second three-phase coils 32A and 32B. Moreover, the stator coil 32 may also be comprised of a pair of three-phase coils each of which is either Y-connected or Δ-connected. Furthermore, the stator coil 32 may also be comprised of only one three-phase coil which is either Y-connected or Δ-connected.

In the previous embodiment, the present invention is applied to the stator 3 of the automotive alternator 1. However, the invention can also be applied to stators of other rotating electric machines, such as a stator of an electric motor and a stator of a motor-generator that can selectively function either as an electric motor or as an electric generator.

What is claimed is:

1. A stator for a rotating electric machine, the stator comprising:
   an annular stator core having a plurality of slots formed therein, the slots being spaced from one another in a circumferential direction of the stator core;
   a stator coil comprised of a plurality of windings mounted on the stator core, the windings being connected in a predetermined manner to form a plurality of connection portions therebetween, the connection portions being located outside the slots of the stator core on one axial side of the stator core, wherein at each of the connection portions, two or more of the windings are electrically connected with each other to form a junction point between the two or more of the windings; and at least one protective wall provided radially inside the connection portions of the stator coil so as to shield the connection portions from a radially inside of the stator, the at least one protective wall extending over an entire circumferential range of the connection portions, wherein the stator coil has a coil end part that protrudes from an axial end face of the stator core, the connection portions protruding from the coil end part; and the at least one protective wall is provided axially outside the coil end part.

2. The stator as set forth in claim 1, wherein the at least one protective wall is formed of part of the stator coil.

3. The stator as set forth in claim 2, wherein the at least one protective wall is formed of at least one bridging wire that bridges two different sections of a corresponding one of the windings of the stator coil.

4. The stator as set forth in claim 3, wherein the at least one bridging wire comprises a bridging wire that continuously extends in the circumferential direction of the stator core over an angular range within which two or more of the connection portions of the stator coil are arranged.

5. The stator as set forth in claim 3, wherein the at least one bridging wire has a polygonal cross-sectional shape and is bent to have a curved side face facing radially inward.

6. The stator as set forth in claim 3, wherein the at least one bridging wire comprises a plurality of bridging wires that are arranged in alignment with each other in an axial direction of the stator core.

7. The stator as set forth in claim 3, wherein the at least one protective wall comprises a plurality of protective walls that are separated from one another in the circumferential direction of the stator core, and each of the plurality of protective walls is formed of at least one bridging wire.

8. The stator as set forth in claim 1, wherein the at least one protective wall has a greater axial height than the connection portions of the stator coil.

9. The stator as set forth in claim 1, wherein the stator is mounted in the rotating electric machine so as to have a cooling fan located radially inside the stator, and the at least one protective wall is axially positioned so as to be radially aligned with the cooling fan.

* * * * *